United States Patent
Duchesne et al.

(10) Patent No.: US 10,766,990 B2
(45) Date of Patent: Sep. 8, 2020

(54) TETRAFLUOROETHYLENE/HEXAFLUORO-PROPYLENE COPOLYMERS INCLUDING PERFLUOROALKOXYALKYL PENDANT GROUPS AND METHODS OF MAKING AND USING THE SAME

(71) Applicant: 3M INNOVATIVE PROPERTIES COMPANY, St. Paul, MN (US)

(72) Inventors: Denis Duchesne, Woodbury, MN (US); Klaus Hintzer, Kastl (DE); Harald Kaspar, Burgkirchen (DE); Kai H. Lochhaas, Neuötting (DE); Per M. Nelson, Woodbury, MN (US); Jens C. Schrooten, Muehldorf am Inn (DE); Karl D. Weilandt, Meerbusch (DE); Tilman C. Zipplies, Burghausen (DE)

(73) Assignee: 3M Innovative Properties Company, St. Paul, MN (US)

( * ) Notice: Subject to any disclaimer, the term of this patent is extended or adjusted under 35 U.S.C. 154(b) by 11 days.

(21) Appl. No.: 15/550,321

(22) PCT Filed: Feb. 12, 2016

(86) PCT No.: PCT/US2016/017740
§ 371 (c)(1),
(2) Date: Aug. 10, 2017

(87) PCT Pub. No.: WO2016/130911
PCT Pub. Date: Aug. 18, 2016

(65) Prior Publication Data
US 2018/0066090 A1    Mar. 8, 2018

Related U.S. Application Data

(60) Provisional application No. 62/115,456, filed on Feb. 12, 2015.

(51) Int. Cl.
| | |
|---|---|
| C08F 214/26 | (2006.01) |
| C08J 5/12 | (2006.01) |
| H01B 3/44 | (2006.01) |
| C08F 214/28 | (2006.01) |
| C08F 2/28 | (2006.01) |
| C08K 3/08 | (2006.01) |

(52) U.S. Cl.
CPC .............. *C08F 214/26* (2013.01); *C08F 2/28* (2013.01); *C08F 214/262* (2013.01); *C08F 214/28* (2013.01); *C08J 5/121* (2013.01); *C08K 3/08* (2013.01); *H01B 3/445* (2013.01); *C08F 2500/12* (2013.01); *C08F 2800/10* (2013.01); *C08K 2003/0818* (2013.01)

(58) Field of Classification Search
CPC ...... C08F 214/26; C08F 2/28; C08F 214/262; C08F 214/28; C08F 2500/12; C08F 2800/10; C08F 2003/0818; C08J 5/121; C08K 3/08; C08K 2003/0818; H01B 3/445
USPC ........................................................ 526/247
See application file for complete search history.

(56) References Cited

U.S. PATENT DOCUMENTS

| | | |
|---|---|---|
| 2,559,752 A | 7/1951 | Berry |
| 3,085,083 A | 4/1963 | Schreyer |
| 3,282,875 A | 11/1966 | Connolly |
| 3,718,627 A | 2/1973 | Grot |
| 4,267,364 A | 5/1981 | Grot |
| 4,273,729 A | 6/1981 | Krespan |
| 4,349,650 A | 9/1982 | Krespan |
| 4,552,925 A | 11/1985 | Nakagawa |
| 4,621,116 A | 11/1986 | Morgan |
| 4,675,380 A | 6/1987 | Buckmaster |

(Continued)

FOREIGN PATENT DOCUMENTS

| | | |
|---|---|---|
| EP | 0423995 | 4/1991 |
| GB | 1210794 | 10/1970 |

(Continued)

OTHER PUBLICATIONS

Auhl, "Molecular Characterization of Semi-Fluorinated Copolymers with a Controlled Amount of Long-Chain Branching", Macromolecules, 2006, vol. 39, No. 6, pp. 2316-2324.
Cheremisinoff, "Encyclopedia of Fluid Mechanics", 209-242, (1990).
Cogswell, Polymer Melt Rheology, 6pgs (1981).
Nelson, "High End-Group Containing FEP for Improved Bond between FEP Coating and Substrate", ip.com, Dec. 2008, 4pgs.
Scheirs, Modern Fluoropolymers—High Performance Polymers for Diverse Applications, 240-255 (1997).
Scheirs, Modern Fluoropolymers—High Performance Polymers for Diverse Applications, 224-237 (1997).

(Continued)

*Primary Examiner* — Ronald Grinsted

(57) ABSTRACT

A copolymer having tetrafluoroethylene units, hexafluoropropylene units, and units independently represented by formula in a range from 0.02 to 2 mole percent, based on the total amount of the copolymer. Rf is a linear or branched perfluoroalkyl group having from 1 to 8 carbon atoms and optionally interrupted by one or more —O— groups, n is from 1 to 6, and m is 0 or 1. The copolymer has a melt flow index in a range from 25 grams per 10 minutes to 35 grams per 10 minutes and has up to 50 unstable end groups per $10^6$ carbon atoms. The copolymer can be extruded to make articles, such as insulated cables. A method of making the copolymer is also disclosed.

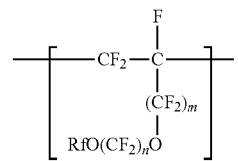

20 Claims, No Drawings

(56) References Cited

U.S. PATENT DOCUMENTS

| | | |
|---|---|---|
| 4,743,658 A | 5/1988 | Imbalzano |
| 4,764,538 A | 8/1988 | Buckmaster |
| 4,877,815 A | 10/1989 | Buckmaster |
| 5,010,130 A | 4/1991 | Chapman, Jr. |
| 5,013,792 A | 5/1991 | Chapman, Jr. |
| 5,064,594 A | 11/1991 | Priester |
| 5,089,200 A | 2/1992 | Chapman, Jr. |
| 5,093,409 A | 3/1992 | Buckmaster |
| 5,132,368 A | 6/1992 | Chapman, Jr. |
| 5,182,342 A | 1/1993 | Feiring |
| 5,285,002 A | 2/1994 | Grootaert |
| 5,378,782 A | 1/1995 | Grootaert |
| 5,442,097 A | 8/1995 | Obermeier |
| 5,463,021 A | 10/1995 | Beyer |
| 5,610,203 A | 3/1997 | Buckmaster |
| 5,677,404 A | 10/1997 | Blair |
| 5,688,457 A | 11/1997 | Buckmaster |
| 5,703,185 A | 12/1997 | Blair |
| 5,726,214 A | 3/1998 | Buckmaster |
| 5,780,552 A | 7/1998 | Kerbow |
| 5,874,523 A | 2/1999 | Schmiegel |
| 5,885,494 A | 3/1999 | Venkataraman |
| 6,255,536 B1 | 7/2001 | Worm |
| 6,294,627 B1 | 9/2001 | Worm |
| 6,395,848 B1 | 5/2002 | Morgan |
| 6,429,258 B1 | 8/2002 | Morgan |
| 6,521,708 B2 | 2/2003 | Lee |
| 6,541,588 B1 | 4/2003 | Kaulbach |
| 6,613,941 B1 | 9/2003 | Felix |
| 6,686,426 B2 | 2/2004 | Kaulbach |
| 6,693,164 B2 | 2/2004 | Blong |
| 6,703,464 B2 | 3/2004 | Kono |
| 6,706,193 B1 | 3/2004 | Burkard |
| 6,743,508 B2 | 6/2004 | Kono |
| 6,794,487 B2 | 9/2004 | Hiraga |
| 6,794,550 B2 | 9/2004 | Hintzer |
| 6,812,310 B2 | 11/2004 | Grootaert |
| 6,838,545 B2 | 1/2005 | Chapman |
| 6,869,997 B2 * | 3/2005 | Wille .................. C08F 14/18 524/544 |
| 7,018,541 B2 | 3/2006 | Hintzer |
| 7,060,772 B2 | 6/2006 | Hintzer |
| 7,105,619 B2 | 9/2006 | Kono et al. |
| 7,122,609 B2 | 10/2006 | Earnest, Jr. |
| 7,126,056 B2 | 10/2006 | Earnest, Jr. |
| 7,208,569 B2 | 4/2007 | Chapman, Jr. |
| 7,214,740 B2 | 5/2007 | Lochhaas |
| 7,435,786 B2 | 10/2008 | Earnest, Jr. |
| 7,473,848 B2 | 1/2009 | Kenny |
| 7,579,418 B2 | 8/2009 | DeFeo |
| 7,638,709 B2 | 12/2009 | Kenny |
| 7,671,112 B2 | 3/2010 | Hintzer |
| 7,795,539 B2 | 9/2010 | Thuot |
| 7,923,519 B2 | 4/2011 | Kono |
| 8,076,431 B2 | 12/2011 | Earnest |
| 8,153,701 B2 | 4/2012 | Venkataraman |
| 8,178,592 B2 | 5/2012 | Burch |
| 8,354,461 B2 | 1/2013 | Venkataraman |
| 8,674,042 B2 | 3/2014 | Earnest |
| 2003/0013791 A1 | 1/2003 | Blong |
| 2003/0026995 A1 | 2/2003 | Duchesne |
| 2003/0153699 A1 | 8/2003 | Ameduri |
| 2003/0153701 A1 | 8/2003 | Kono |
| 2003/0192826 A1 | 10/2003 | Wang |
| 2004/0024155 A1 * | 2/2004 | Hintzer .................. C08F 214/26 526/292.9 |
| 2004/0242783 A1 | 12/2004 | Yabu |
| 2006/0199898 A1 | 9/2006 | Funaki |
| 2006/0223924 A1 | 10/2006 | Tsuda |
| 2006/0281946 A1 | 12/2006 | Morita |
| 2007/0015865 A1 | 1/2007 | Hintzer |
| 2007/0060699 A1 | 3/2007 | Tsuda |
| 2007/0117915 A1 | 5/2007 | Funaki |
| 2007/0142513 A1 | 6/2007 | Tsuda |
| 2007/0142541 A1 | 6/2007 | Hintzer |
| 2010/0212929 A1 | 8/2010 | Ishii |
| 2010/0326697 A1 | 12/2010 | Venkataraman |
| 2011/0172338 A1 | 7/2011 | Murakami |
| 2012/0289616 A1 | 11/2012 | Arcella et al. |
| 2014/0255703 A1 | 9/2014 | Aten |
| 2015/0353700 A1 | 12/2015 | Isaka et al. |
| 2018/0016375 A1 | 1/2018 | Duchesne |
| 2018/0030183 A1 | 2/2018 | Duchesne |
| 2018/0030184 A1 | 2/2018 | Duchesne |
| 2018/0057625 A1 | 3/2018 | Hintzer |

FOREIGN PATENT DOCUMENTS

| | | |
|---|---|---|
| GB | 2459672 | 11/2009 |
| WO | WO 2009-102660 | 8/2009 |

OTHER PUBLICATIONS

Teng, "Overview of the development of the fluoropolymer industry", .Applied Sciences, 2012, vol. 2, pp. 496-512.

Tuminello, "Molecular Weight and Molecular Weight Distribution from Dynamic Measurements of Polymer Melts", *Polym. Eng. Sci.* Oct. 1986, vol. 26, No. 19, pp. 1339-1347.

International Search Report for PCT International Application No. PCT/US2016/017740, dated Apr. 13, 2016, 4pgs.

\* cited by examiner

TETRAFLUOROETHYLENE/HEXAFLUOROPROPYLENE COPOLYMERS INCLUDING PERFLUOROALKOXYALKYL PENDANT GROUPS AND METHODS OF MAKING AND USING THE SAME

CROSS REFERENCE TO RELATED APPLICATION

This application is a national stage filing under 35 U.S.C. 371 of PCT/US2016/017740, filed Feb. 12, 2016, which claims priority to U.S. Provisional Application No. 62/115,456, filed Feb. 12, 2015, the disclosure of which is incorporated by reference in its entirety herein.

BACKGROUND

Melt processable copolymers of tetrafluoroethylene (TFE) and hexafluoropropylene (HFP), known under the name FEP (that is, fluorinated ethylene-propylene copolymer), have useful properties such as chemical resistance, weather resistance, low flammability, thermal stability, and excellent electrical properties. Such beneficial properties render these fluoropolymers useful, for example, in articles such as tubes, pipes, foils, and films. Various embodiments of FEP copolymers have also been reported useful as coatings for wires and cables. See, for example, U.S. Pat. Nos. 5,677,404 and 5,703,185, each to Blair; U.S. Pat. No. 6,541,588 (Kaulbach); U.S. Pat. Nos. 6,743,508 and 7,923,519, each to Kono; and U.S. Pat. Nos. 7,122,609 and 7,126,056, each to Earnest.

Using perfluoroalkoxyalkyl vinyl ethers as comonomers with tetrafluoroethylene has been reported in U.S. Pat. No. 7,060,772 (Hintzer).

SUMMARY

The present disclosure provides a fluorinated ethylene-propylene (FEP) copolymer useful, for example, for wire coating. With a melt flow index (MFI) of 30±5, the copolymer can typically be extruded at high speed. In some embodiments, the copolymer exhibits an onset of melt fracture at a higher shear rate than certain commercially available FEP copolymers. With up to 50 unstable end groups per $10^6$ carbon atoms, any discoloration or bubbling caused by thermal degradation may be avoided during the processing of these polymers.

In one aspect, the present disclosure provides copolymer having tetrafluoroethylene units, hexafluoropropylene units, and units independently represented by formula

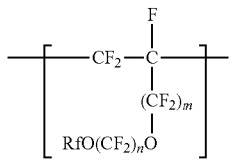

in a range from 0.02 to 2 mole percent, based on the total amount of the copolymer. Rf is a linear or branched perfluoroalkyl group having from 1 to 8 carbon atoms and optionally interrupted by one or more —O— groups, n is from 1 to 6, and m is 0 or 1. The copolymer has a melt flow index in a range from 25 grams per 10 minutes to 35 grams per 10 minutes and has up to 50 unstable end groups per $10^6$ carbon atoms. The unstable end groups typically comprise at least one of —COOM, —CH$_2$OH, —COF, and —CONH$_2$, wherein M is independently an alkyl group, a hydrogen atom, a metallic cation, or a quaternary ammonium cation.

In another aspect, the present disclosure provides copolymer having tetrafluoroethylene units, hexafluoropropylene units, and units independently represented by formula

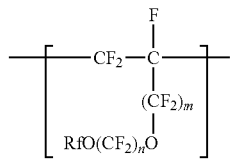

in a range from 0.02 to 2 mole percent, based on the total amount of the copolymer. Rf is a linear or branched perfluoroalkyl group having from 1 to 8 carbon atoms and optionally interrupted by one or more —O— groups, n is from 1 to 6, and m is 0 or 1. The copolymer has a melt flow index in a range from 25 grams per 10 minutes to 35 grams per 10 minutes and includes at least 25 ppm alkali-metal cations.

In another aspect, the present disclosure provides a method of making an extruded article. The method includes extruding a melted composition that includes either of the copolymers described above. In some embodiments, the melted composition consists of either of the copolymers described above. In some embodiments, the extruded article is a film, tube, pipe, or hose. In some embodiments, the melted composition is extruded onto a conductor. In some embodiments, the melted composition is extruded onto a cable.

In another aspect, the present disclosure provides an extruded article that includes either of the copolymers described above. In some embodiments, the extruded article is a film, tube, pipe, or hose. In some embodiments, the extruded article is a conductor having the copolymer extruded on it. In some embodiments, the extruded article is a cable having the copolymer extruded on it.

In another aspect, the present disclosure provides a method of making a copolymer described above. The method includes copolymerizing components that include tetrafluoroethylene, hexafluoropropylene, and at least one compound independently represented by formula CF$_2$=CF(CF$_2$)$_m$O(CF$_2$)$_n$ORf. Rf is a linear or branched perfluoroalkyl group having from 1 to 8 carbon atoms and optionally interrupted by one or more —O— groups, n is from 1 to 6, and m is 0 or 1. Copolymerizing may be carried out, for example, by aqueous emulsion polymerization or suspension polymerization in the presence of an initiator or a buffer including alkali-metal cations.

In another aspect, the present disclosure provides a method of making a copolymer. The method includes copolymerizing components that include tetrafluoroethylene, hexafluoropropylene, and at least one compound independently represented by formula CF$_2$=CF(CF$_2$)$_x$(OC$_y$F$_{2y}$)$_z$ORf. Rf is a linear or branched perfluoroalkyl group having from 1 to 8 carbon atoms and optionally interrupted by one or more —O— groups, z is 1 or 2, y is from 1 to 6, and x is 0 or 1. Copolymerizing is carried out in the presence of an initiator or a buffer including alkali-metal cations.

In general, perfluorinated polymers have unstable end groups (e.g. —COOH and —COF) resulting from the polymerization process. These unstable end groups can lead to discoloration and bubbling during the processing of these polymers. Therefore these polymers are typically stabilized either by post-fluorination or by decarboxylation at high temperatures to remove unstable end groups. Such processes are costly and time-consuming. It has now been unexpectedly found that in the presence of at least 25 ppm alkali-metal cations in the polymer, the unstable end groups can be removed at much lower temperatures. The unstable end groups can be removed during drying of the perfluorinated polymer, for example, to achieve a low level of unstable end groups (e.g., up to or less than 50 unstable end groups per $10^6$ carbon atoms). Accordingly, the post-fluorination step can either be sped up or avoided altogether.

In this application:

Terms such as "a", "an" and "the" are not intended to refer to only a singular entity, but include the general class of which a specific example may be used for illustration. The terms "a", "an", and "the" are used interchangeably with the term "at least one".

The phrase "comprises at least one of" followed by a list refers to comprising any one of the items in the list and any combination of two or more items in the list. The phrase "at least one of" followed by a list refers to any one of the items in the list or any combination of two or more items in the list.

The terms "perfluoro" and "perfluorinated" refer to groups in which all C—H bonds are replaced by C—F bonds.

The phrase "interrupted by at least one —O— group", for example, with regard to a perfluoroalkyl or perfluoroalkylene group refers to having part of the perfluoroalkyl or perfluoroalkylene on both sides of the —O— group. For example, —CF$_2$CF$_2$—O—CF$_2$—CF$_2$— is a perfluoroalkylene group interrupted by an —O—.

All numerical ranges are inclusive of their endpoints and nonintegral values between the endpoints unless otherwise stated (e.g., 1 to 5 includes 1, 1.5, 2, 2.75, 3, 3.80, 4, 5, etc.).

DETAILED DESCRIPTION

The copolymer according to the present disclosure may be useful for a variety of applications. For example, copolymers according to the present disclosure are useful for insulating cable or wire. Such insulated cable may be useful, for example, as a communication cable (e.g., a data transmission cable such as a "Local Area Network" (LAN) cable). In general, the insulated cable can be manufactured by extrusion coating molten copolymer in the shape of a tube and then drawing down the copolymer by inserting a core wire through the center portion of the resin tube in its axial direction. The term "draw-down" as used herein means extending a molten resin extruded from a die having an opening of relatively large sectional area to its final intended dimensions. The draw-down is characterized by a draw-down ratio (DDR), which is the ratio of the sectional area of the opening of the die to the sectional area of the insulated material of the final product. In general, the draw-down ratio is suitably from 50 to 150.

The copolymer according to the present disclosure comprises a copolymer of tetrafluoroethylene (TFE) and hexafluoropropylene (HFP). The copolymer according to the present disclosure is an at least partially crystalline fluoroplastic. A person skilled in the art can select the amount of HFP to include in the copolymer to make an at least partially crystalline FEP. In some embodiments, the HFP is present in a range from 5 weight percent (wt. %) to 22 wt. %, in a range from 10 wt. % to 17 wt. %, in a range from 11 wt. % to 16 wt. %, or in a range from 11.5 wt. % to 15.8 wt. %, based on the total weight of the copolymer.

The copolymer according to the present disclosure further includes copolymerized units independently represented by formula:

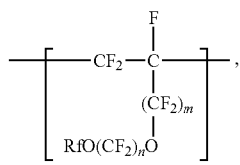

in which m is 0 or 1, n is from 1 to 6 and Rf is a linear or branched perfluoroalkyl group having from 1 to 8 carbon atoms and optionally interrupted by one or more —O— groups. In some embodiments, n is from 1 to 4, or from 1 to 3, or from 2 to 3, or from 2 to 4. In some embodiments, n is 1 or 3. In some embodiments, n is 3. In some embodiments, Rf is a linear perfluoroalkyl group having from 1 to 8 (or 1 to 6) carbon atoms that is optionally interrupted by up to 4, 3, or 2 —O— groups. In some embodiments, Rf is a linear perfluoroalkyl group having from 1 to 4 carbon atoms optionally interrupted by one —O— group. In some embodiments, —O(CF$_2$)$_n$ORf is represented by —O—(CF$_2$)$_{1-4}$—[O(CF$_2$)$_{1-4}$]$_{0-4}$—O—(CF$_2$)$_{0-2}$CF$_3$ having up to 12 carbon atoms total. In some embodiments, m is 0. In embodiments in which m is 0, copolymers are prepared by copolymerizing components including tetrafluoroethylene, hexafluoropropylene, and at least one perfluoroalkoxyalkyl vinyl ether independently represented by formula CF$_2$=CFO(CF$_2$)$_n$ORf, in which n and Rf are as defined above in any of their embodiments. Examples of suitable perfluoroalkoxyalkyl vinyl ethers include CF$_2$=CFOCF$_2$OCF$_3$, CF$_2$=CFOCF$_2$OCF$_2$CF$_3$, CF$_2$=CFOCF$_2$CF$_2$OCF$_3$, CF$_2$=CFOCF$_2$CF$_2$CF$_2$OCF$_3$, CF$_2$=CFOCF$_2$CF$_2$OCF$_2$CF$_3$, CF$_2$=CFOCF$_2$CF$_2$CF$_2$OCF$_2$CF$_3$, CF$_2$=CFOCF$_2$CF$_2$CF$_2$CF$_2$OCF$_2$CF$_3$, CF$_2$=CFOCF$_2$CF$_2$OCF$_2$OCF$_3$, CF$_2$=CFOCF$_2$CF$_2$OCF$_2$CF$_2$OCF$_3$, CF$_2$=CFOCF$_2$CF$_2$OCF$_2$CF$_2$ CF$_2$OCF$_3$, CF$_2$=CFOCF$_2$CF$_2$OCF$_2$CF$_2$CF$_2$CF$_2$OCF$_3$, CF$_2$=CFOCF$_2$CF$_2$OCF$_2$CF$_2$CF$_2$CF$_2$OCF$_3$, CF$_2$=CFOCF$_2$(OCF$_2$)$_3$OCF$_3$, CF$_2$=CFOCF$_2$CF$_2$(OCF$_2$)$_4$OCF$_3$, CF$_2$=CFOCF$_2$CF$_2$OCF$_2$OCF$_2$OCF$_3$, CF$_2$=CFOCF$_2$CF$_2$OCF$_2$CF$_2$CF$_3$, and CF$_2$=CFOCF$_2$CF$_2$OCF$_2$CF$_2$OCF$_2$CF$_2$CF$_3$. Many of these perfluoroalkoxyalkyl vinyl ethers can be prepared according to the methods described in U.S. Pat. No. 6,255,536 (Worm et al.) and U.S. Pat. No. 6,294,627 (Worm et al.). It should be understood that when m is 0, the units copolymerized with tetrafluoroethylene units and hexafluoropropylene units are represented by formula:

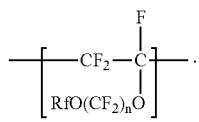

In some embodiments, m is 1. In embodiments in which m is 1, copolymers are prepared by copolymerizing components including tetrafluoroethylene, hexafluoropropylene, and at least one perfluoroalkoxyalkyl allyl ether independently represented by formula $CF_2=CFCF_2O(CF_2)_nORf$, in which n and Rf are as defined above in any of their embodiments. Examples of suitable perfluoroalkoxyalkyl allyl ethers include $CF_2=CFCF_2OCF_2CF_2OCF_3$, $CF_2=CFCF_2OCF_2CF_2CF_2OCF_3$, $CF_2=CFCF_2OCF_2OCF_3$, $CF_2=CFCF_2OCF_2OCF_2CF_3$, $CF_2=CFCF_2OCF_2$ $CF_2CF_2OCF_3$, $CF_2=CFCF_2OCF_2CF_2OCF_2CF_3$, $CF_2=CFCF_2OCF_2CF_2CF_2OCF_2CF_3$, $CF_2=CFCF_2OCF_2CF_2$ $CF_2CF_2OCF_2CF_3$, $CF_2=CFCF_2OCF_2CF_2OCF_2OCF_3$, $CF_2=CFCF_2OCF_2CF_2OCF_2CF_2OCF_3$, $CF_2=CFCF_2OCF_2CF_2$ $OCF_2CF_2CF_2OCF_3$, $CF_2=CFCF_2OCF_2CF_2OCF_2CF_2CF_2$ $CF_2OCF_3$, $CF_2=CFCF_2OCF_2CF_2OCF_2CF_2CF_2CF_2CF_2$ $CF_2OCF_3$, $CF_2=CFCF_2OCF_2CF_2(OCF_2)_3OCF_3$, $CF_2=CFCF_2OCF_2CF_2(OCF_2)_4OCF_3$, $CF_2=CFCF_2OCF_2CF_2$ $OCF_2OCF_2OCF_3$, $CF_2=CFCF_2OCF_2CF_2OCF_2CF_2CF_3$, $CF_2=CFCF_2OCF_2CF_2OCF_2CF_2OCF_2CF_2CF_3$, $CF_2=CFCF_2OCF_2CF(CF_3)-O-C_3F_7$, and $CF_2=CFCF_2(OCF_2CF(CF_3))_2-O-C_3F_7$. Many of these perfluoroalkoxyalkyl allyl ethers can be prepared, for example, according to the methods described in U.S. Pat. No. 4,349,650 (Krespan).

The copolymerized units independently represented by formula:

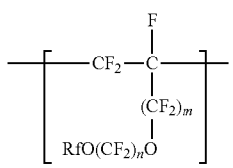

are present in the copolymer according to the present disclosure in a range from 0.02 mole percent to 2 mole percent, based on the total amount of the copolymer. In some embodiments, the copolymerized units are present in the copolymer at up to 1.5 mole percent or up to 1.0 mole percent. In some embodiments, the copolymerized units represented by this formula are present in the copolymer in an amount of at least 0.03 mole percent or 0.05 mole percent. The copolymerized units may be present in the copolymer in a range from 0.02 mole percent to 2 mole percent, 0.05 mole percent to 1.5 mole percent, or 0.1 mole percent to 1.0 mole percent. Copolymers according to the present disclosure may include any combination of one or more of any of the above embodiments of these copolymerized units.

In some embodiments, the FEP copolymer according to the present disclosure may include other copolymerized units. For example, the copolymer can include up to 3, 2, 1, or 0.5 mole percent of copolymerized units represented by formula

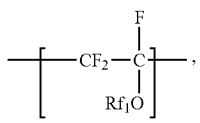

in which $Rf_1$ is a perfluoroalkyl group having from 1 to 8 carbon atoms. In some embodiments, $Rf_1$ is a perfluoroalkyl group having from 1 to 6, 1 to 5, 1 to 4, or 1 to 3 carbon atoms. These units are typically incorporated into the copolymer by including perfluoroalkyl vinyl ethers [e.g., perfluoromethyl vinyl ether ($CF_2=CFOCF_3$), perfluoroethyl vinyl ether ($CF_2=CFOCF_2CF_3$), and perfluoropropyl vinyl ether ($CF_2=CFOCF_2CF_2CF_3$)] in the components that are copolymerized. In some embodiments, the copolymers according to the present disclosure are substantially free of such perfluoroalkyl vinyl ether-derived units. For example, the copolymer can include up to 0.05, 0.02, or 0.01 mole percent of such perfluoroalkyl vinyl ether-derived units. The term "substantially free of" also includes copolymers that include none of these perfluoroalkyl vinyl ether-derived units.

The copolymers according to the present disclosure typically have a melting point in a range from 220° C. to 285° C., in some embodiments, 235° C. to 275° C., 240° C. to 270° C. or 245° C. to 265° C.

The molecular weights of FEP copolymers are often characterized by the melt viscosity or the melt flow index (MFI). The copolymer according to the present disclosure has an MFI of 30±5 grams per 10 minutes. In some embodiments, the copolymer according to the present disclosure has an MFI of 30±4 grams per 10 minutes or 30±3 grams per 10 minutes. When the MFI is 30±5 grams per 10 minutes, high-speed extrusion is possible, the extruded polymer can be readily drawn down, and melt fracture (that is, abnormal flow and surface roughness of the extruded polymer) is minimized. If the MFI is less than 25 grams per 10 minutes, high extrusion rates are difficult to achieve. Also, an FEP having an MFI of up to about 35 typically performs better under cable burn performance evaluation than FEP copolymers with higher MFIs due to a lower tendency to flow at high temperature. The copolymer according to the present disclosure can be adjusted to have an MFI of 30±5 grams per 10 minutes by adjusting the amount of the initiator and/or chain-transfer agent used during polymerization, both of which affect the molecular weight and molecular-weight distribution of the copolymer. MFI can also be controlled by the rate of addition of initiator to the polymerization. Variations in the monomer composition can also affect the MFI. For the purposes of the present disclosure, the MFI is measured according to the test method described in the Examples, below.

At a given MFI, even relatively low levels of a comonomer having a perfluoroalkoxyalkyl pendant group as described herein can improve the properties of an FEP copolymer. As shown in the Examples, below, in some embodiments, copolymers according to the present disclosure have an onset of melt fracture at a higher shear rate than certain commercially available FEP copolymers that either do not include oxygen-containing groups or include perfluoroalkoxy groups instead of perfluoroalkoxyalkyl pendant groups. Accordingly, copolymers according to the present disclosure may be useful at higher shear rates than such comparative FEP copolymers having comparable levels of perfluoroalkyl vinyl ether modification. We have also observed that even at low levels, a comonomer having a perfluoroalkoxyalkyl pendant group may increase the elongation viscosity of an FEP copolymer and may have a positive effect on the rupture durability and cable burn performance of the FEP copolymer.

The production of foamed insulation cable is different from the high line speed production of solid wire insulation, and lower MFIs are useful in the production of foamed insulation cable. Thus, in some embodiments, the copolymer according to the present disclosure is not foamed. In these embodiments, the copolymer generally does not include a foam cell nucleating agent (e.g., a $F(CF_2)_xCH_2CH_2$-sulfonic or phosphonic acid or salt, wherein x is 6, 8, 10, or 12 or a mixture thereof that may or may not be combined with boron nitride). Likewise, in some embodiments of the extruded article according to and/or made according to the present disclosure, the extruded article is not foamed or does not include a foam cell nucleating agent. In some of these embodiments, the extruded article is not a foamed insulation cable.

However, it may be desirable in some applications for the copolymer according to the present disclosure to be foamed. In these embodiments, the copolymer can include a foam cell nucleating agent as described above. Likewise, in some embodiments of the extruded article according to and/or made according to the present disclosure, the extruded article is foamed or includes a foam cell nucleating agent. In some of these embodiments, the extruded article is a foamed insulation cable.

It has been reported in U.S. Pat. No. 4,552,925 (Nakagawa et al.), for example, that high extrusion speed can be achieved for FEP copolymers when the molecular-weight distribution of the copolymer is very broad. To achieve a broad molecular-weight distribution, a mixture of at least two FEP copolymers with largely differing molecular weights (as measured by MFI, for example) can be used. The desired mixtures are often produced by polymerizing the components separately and mixing them in form of the latices, reactor beads, or fluff before melt pelletizing. Thus, the manufacturing of these mixtures is a cumbersome and costly process.

In contrast, in some embodiments, the copolymer according to the present disclosure has a relatively low polydispersity. The polydispersity, which is a ratio of the weight-average molecular weight (Mw) to the number-average molecular weight (Mn) of the copolymer, can be up to about 2.5, 2.3, 2.2, or 2.0. The polydispersity may be as low as 1.5. Polydispersity is measured according to a modified version of the method published by W. H. Tuminello in Polym. Eng. Sci. 26, 1339 (1986), described in the Examples, below.

Copolymers according to the present disclosure can be prepared in a variety of ways. Conveniently, the method of making the copolymer according to the present disclosure includes radical aqueous emulsion polymerization.

When conducting emulsion polymerization, perfluorinated or partially fluorinated emulsifiers may be useful. Generally these fluorinated emulsifiers are present in a range from about 0.02% to about 3% by weight with respect to the polymer. Polymer particles produced with a fluorinated emulsifier typically have an average diameter, as determined by dynamic light scattering techniques, in range of about 10 nanometers (nm) to about 300 nm, and in some embodiments in range of about 50 nm to about 200 nm. Examples of suitable emulsifiers include perfluorinated and partially fluorinated emulsifier having the formula $[R_f\text{—O-L-COO}^-]_i$ $X^{i+}$ wherein L represents a linear partially or fully fluorinated alkylene group or an aliphatic hydrocarbon group, $R_f$ represents a linear partially or fully fluorinated aliphatic group or a linear partially or fully fluorinated aliphatic group interrupted with one or more oxygen atoms, $X^{i+}$ represents a cation having the valence i and i is 1, 2 or 3. (See, e.g., U.S. Pat. No. 7,671,112 to Hintzer et al.). Additional examples of suitable emulsifiers also include perfluorinated polyether emulsifiers having the formula $CF_3\text{—}(OCF_2)_x\text{—O—CF}_2\text{—}$ X, wherein x has a value of 1 to 6 and X represents a carboxylic acid group or salt thereof, and the formula $CF_3\text{—O—}(CF_2)_3\text{—}(OCF(CF_3)\text{—CF}_2)_y\text{—O-L-Y}$ wherein y has a value of 0, 1, 2 or 3, L represents a divalent linking group selected from $\text{—CF(CF}_3)\text{—}$, $\text{—CF}_2\text{—}$, and $\text{—CF}_2CF_2\text{—}$, and Y represents a carboxylic acid group or salt thereof. (See, e.g., U.S. Pat. Publ. No. 2007/0015865 to Hintzer et al.). Other suitable emulsifiers include perfluorinated polyether emulsifiers having the formula $R_fO$ $(CF_2CF_2O)_xCF_2COOA$ wherein $R_f$ is $C_bF_{(2b+1)}$; where b is 1 to 4, A is a hydrogen atom, an alkali metal or $NH_4$, and x is an integer of from 1 to 3. (See, e.g., U.S. Pat. Publ. No. 2006/0199898 to Funaki et al.). Suitable emulsifiers also include perfluorinated emulsifiers having the formula $F(CF_2)_bO(CF_2CF_2O)_xCF_2COOA$ wherein A is a hydrogen atom, an alkali metal or $NH_4$, b is an integer of from 3 to 10, and x is 0 or an integer of from 1 to 3. (See, e.g., U.S. Pat. Publ. No. 2007/0117915 to Funaki et al.). Further suitable emulsifiers include fluorinated polyether emulsifiers as described in U.S. Pat. No. 6,429,258 to Morgan et al. and perfluorinated or partially fluorinated alkoxy acids and salts thereof wherein the perfluoroalkyl component of the perfluoroalkoxy has 4 to 12 carbon atoms, or 7 to 12 carbon atoms. (See, e.g., U.S. Pat. No. 4,621,116 to Morgan). Suitable emulsifiers also include partially fluorinated polyether emulsifiers having the formula $[R_f\text{—(O)}_t\text{—}$ $CHF\text{—(CF}_2)_x\text{—COO-}]_iX^{i+}$ wherein $R_f$ represents a partially or fully fluorinated aliphatic group optionally interrupted with one or more oxygen atoms, t is 0 or 1 and x is 0 or 1, $X^{i+}$ represents a cation having a valence i and i is 1, 2 or 3. (See, e.g., U.S. Pat. Publ. No. 2007/0142541 to Hintzer et al.). Further suitable emulsifiers include perfluorinated or partially fluorinated ether-containing emulsifiers as described in U.S. Pat. Publ. Nos. 2006/0223924, 2007/0060699, and 2007/0142513 (each to Tsuda et al.) and 2006/0281946 (Morita et al.). Fluoroalkyl, for example, perfluoroalkyl carboxylic acids and salts thereof having 6-20 carbon atoms, such as ammonium perfluorooctanoate (APFO) and ammonium perfluorononanoate (see, e.g., U.S. Pat. No. 2,559,752 to Berry) may also be useful.

If desired, the emulsifiers can be removed or recycled from the fluoropolymer latex as described in U.S. Pat. No. 5,442,097 to Obermeier et al., U.S. Pat. No. 6,613,941 to Felix et al., U.S. Pat. No. 6,794,550 to Hintzer et al., U.S. Pat. No. 6,706,193 to Burkard et al., and U.S. Pat. No. 7,018,541 to Hintzer et al.

In some embodiments of the method of making the copolymer according to the present disclosure, the polymerization process may be conducted with no emulsifier or with no fluorinated emulsifier.

In some embodiments of the method of making the copolymer according to the present disclosure, a water-soluble initiator can be useful to start the polymerization process. Salts of peroxy sulfuric acid, such as ammonium persulfate or potassium persulfate, are typically applied either alone or sometimes in the presence of a reducing agent, such as bisulfites or sulfinates (e.g., fluorinated sulfinates disclosed in U.S. Pat. Nos. 5,285,002 and 5,378,782 both to Grootaert) or the sodium salt of hydroxy methane sulfinic acid (sold under the trade designation "RONGALIT", BASF Chemical Company, New Jersey, USA). It is also possible to use organic initiators as disclosed in U.S. Pat. No. 5,182,342 (Feiring et al.). Many of these initiators and the emulsifiers have an optimum pH-range where they show most efficiency. For this reason, buffers are sometimes useful. Buffers include phosphate, acetate, or carbonate (e.g., $(NH_4)_2CO_3$ or $NaHCO_3$) buffers or any other acid or base, such as ammonia or alkali-metal hydroxides. In some embodiments of the method according to the present disclosure, the buffer includes alkali-metal cations. The concentration range for the initiators and buffers can vary from 0.01% to 5% by weight based on the aqueous polymerization medium.

In some embodiments, the copolymers according to the present disclosure comprise at least 25 ppm alkali-metal cations, in some embodiments, at least 50 ppm, 60 ppm, or at least 75 ppm alkali-metal cations. When alkali-metal salts or bases are used as initiators or buffers, for example, the copolymer according to the present disclosure generally comprises at least 25 ppm or 50 ppm alkali-metal cations. In some embodiments, the alkali-metal cations in the polymer arise from buffers (e.g., $NaHCO_3$ or alkali-metal hydroxides). The presence of alkali-metal cations in the copolymer increases the rate of decomposition of unstable carboxylic end-groups during the drying step described below and therefore makes a subsequent post-fluorination step, if needed, easier, faster, and cheaper. Additionally the amount of fluorine gas that is needed to eliminate —$CF_2H$ and —CFH—$CF_3$ end groups is lower.

The alkali-metal ion content of the copolymer can be measured by flame atomic absorption spectrometry after combusting the copolymer and dissolving the residue in an acidic aqueous solution according to the methods described in the Examples, below. For potassium as the analyte, the lower detection limit is less than 1 ppm.

Typical chain-transfer agents like $H_2$, lower alkanes, alcohols, ethers, esters, and methylene fluoride may be useful in the preparation of the copolymer according to the present disclosure. Termination primarily via chain transfer results in a polydispersity of about 2 or less. In some embodiments of the method according to the present disclosure, the polymerization is carried out without any chain-transfer agents. A lower polydispersity can sometimes be achieved in the absence of chain-transfer agents. Recombination typically leads to a polydispersity of about 1.5 for small conversions.

Useful polymerization temperatures can range from 40° C. to 120° C. Typically, polymerization is carried out in a temperature range from 40° C. to 100° C. or 50° C. to 80° C. The polymerization pressure is usually in the range of 0.8 MPa to 2.5 MPa, and in some embodiments in the range from 1.0 MPa to 2.0 MPa. HFP can be precharged and fed into the reactor as described, for example, in *Modern Fluoropolymers*, ed. John Scheirs, Wiley & Sons, 1997, p. 241. Perfluoroalkoxyalkyl vinyl ethers represented by formula $CF_2$=$CFO(CF_2)_n ORf$ and perfluoroalkoxyalkyl allyl ethers represented by formula $CF_2$=$CFCF_2O(CF_2)_n ORf$ are typically liquids and may be sprayed into the reactor or added directly, vaporized, or atomized. Perfluoroalkoxyalkyl vinyl ethers represented by formula $CF_2$=$CFO(CF_2)_n ORf$ and perfluoroalkoxyalkyl allyl ethers represented by formula $CF_2$=$CFCF_2O(CF_2)ORf$ may also be pre-emulsified with an emulsifier before being combined with the other comonomers, for example, before addition of a gaseous fluoroolefin.

The obtained polymer dispersion after aqueous emulsion polymerization can be used as is or, if higher solids are desired, can be upconcentrated. To coagulate the obtained fluoropolymer latex, any coagulant which is commonly used for coagulation of a fluoropolymer latex may be used, and it may, for example, be a water-soluble salt (e.g., calcium chloride, magnesium chloride, aluminum chloride or aluminum nitrate), an acid (e.g., nitric acid, hydrochloric acid or sulfuric acid), or a water-soluble organic liquid (e.g., alcohol or acetone). The amount of the coagulant to be added may be in a range of 0.001 to 20 parts by mass, for example, in a range of 0.01 to 10 parts by mass per 100 parts by mass of the fluoropolymer latex. Alternatively or additionally, the fluoropolymer latex may be frozen for coagulation or mechanically coagulated, for example, with a homogenizer as described in U.S. Pat. No. 5,463,021 (Beyer et al.).

The coagulated copolymer can be collected by filtration and washed with water. The washing water may, for example, be ion-exchanged water, pure water, or ultrapure water. The amount of the washing water may be from 1 to 5 times by mass to the copolymer, whereby the amount of the emulsifier attached to the copolymer can be sufficiently reduced by one washing.

The coagulated copolymer may be agglomerated to produce the polymer in agglomerate form. Agglomerates are typically free-flowing spherical beads with an average size (that is, diameter) of 1 mm to 5 mm. If the agglomerates obtained from agglomerating the coagulated copolymer are too small, it may be desirable to compact the agglomerate to produce a compacted agglomerate which will typically have an average size of 1 mm to 10 mm. In some embodiments, the coagulated copolymer is agglomerated with a water-immiscible organic liquid like gasoline as described in *Modern Fluoropolymers*, ed. by John Scheirs, Wiley & Sons, 1997, p. 227. The agglomerate can be dried, for example, by heating under moderate vacuum at temperatures up to 250° C., 200° C., 190° C., 150° C., or 130° C.

In some embodiments of the method of making the copolymer according to the present disclosure, radical polymerization also can be carried out by suspension polymerization. Suspension polymerization will typically produce particle sizes up to several millimeters.

In some embodiments, the copolymer may be melted, extruded, and cut into granulates of a desired size, which may be called melt granulate.

Fluorinated thermoplastics tend to degrade thermally when processed. The thermal degradation takes place predominantly via the thermally unstable end groups formed during the polymerization, that is, from the end of the chain. FEP copolymers obtained by aqueous emulsion polymerization with inorganic initiators (e.g. persulfates, $KMnO_4$, etc.) typically have a high number of unstable carbon-based end groups (e.g. more than 200 —COOM end groups per $10^6$ carbon atoms). During work-up and melt-pelletizing of FEP copolymers, the copolymers take on a brownish appearance due to thermal degradation. In these cases, the number of unstable end groups may be unacceptable for further high-speed processing. The mechanism of the degradation of thermally unstable end groups has been described in some detail in *Modern Fluoropolymers*, ed. John Scheirs, John Wiley & Sons, 1997, in K. Hintzer and G. Lohr, 'Melt Processable Tetrafluoroethylene-Perfluoropropylvinyl Ether Copolymers (PFA)', page 227f. During the thermal degradation, corrosive gases are produced and considerably impair the quality of the final product via metal contamination or bubble formation, and can corrode tooling and processing machinery. The effect naturally increases as molecular weight decreases and melt flow index increases.

Unstable end groups in the copolymers according to the present disclosure include —COOM, —$CH_2OH$, —COF, and —$CONH_2$, wherein M is independently an alkyl group, a hydrogen atom, a metallic cation, or a quaternary ammonium cation. In some embodiments, the unstable end groups are —COOM and —COF groups.

Various treatments of molten or unmolten fluoropolymer have been proposed to reduce the amount of unstable end groups, resulting in substantial suppression of thermal degradation. When the unstable end groups are acid end groups, —COF or —COOH, the fluoropolymer can be treated with ammonia to form the more stable amide end group —CONH$_2$ or with a primary or secondary amine (e.g., dimethyl, diethyl, or propyl amine) to form amide end groups —CONRH or —CONR$_2$, wherein R is/are the alkyl group(s) of the amine, and wherein for R$_2$, the alkyl groups are the same or different. When the unstable end groups are acid end groups, —COF or —COOH, the fluoropolymer can be treated with an alcohol, such as methanol, ethanol, propanol, or a fluorine containing alcohol to form the more stable ester end groups —COOR' where R' is the alkyl group supplied by the alcohol. When the end groups are —COOH, amide, hydride, —COF, and other non-perfluorinated end groups or —CF=CF$_2$, post-fluorination of the fluoropolymer can be used convert the end groups to —CF$_3$ end groups. When the unstable end groups are —COF or —COOM, the fluoropolymer can be decarboxylated to form the more stable —CF$_2$H and —CFH—CF$_3$ end group, respectively. For example, treatment of fluoropolymers at high temperatures (e.g., 400° C.) with water vapor has been shown to reduce the number of unstable end groups, typically forming —CF$_2$H and —CFH—CF$_3$ end groups (see, e.g., U.S. Pat. No. 3,085,083 (Schreyer)). If M is an alkali cation (e.g., sodium, potassium, or a combination thereof), the decarboxylation is much accelerated and can happen during the drying step. This makes any subsequent post-fluorination step to remove the rest of the unstable end groups easier, faster, and cheaper. Converting the thermally unstable end groups into stable —CF$_3$ end groups by post-fluorination of agglomerate or melt granulate has been described, for example, in U.S. Pat. No. 4,743,658 (Imbalzano et al.) and Great Britain Patent GB1210794, published Oct. 28, 1970. A stationary bed of agglomerate may also be fluorinated as described in U.S. Pat. No. 6,693,164 (Blong). The method of making the copolymer according to the present disclosure can include any of the above methods.

In some embodiments, copolymers according to the present disclosure include —CF$_2$H and/or —CFH—CF$_3$ end groups. In some embodiments of the method according to the present disclosure (e.g., when alkali-metal cations are present) the dried polymer contains predominantly —CF$_2$H and —CFH—CF$_3$ end groups. —CF$_2$H and —CFH—CF$_3$ end groups are sufficiently stable for some applications. However, if post-fluorination is desired to convert the —CF$_2$H and —CFH—CF$_3$ end groups into —CF$_3$ and —CF$_2$CF$_3$ end groups, the post-fluorination is generally easier and faster than when many —COOH end groups are present since a lower number of fluorination cycles is needed to convert the —CF$_2$H and —CFH—CF$_3$ end groups in comparison to —COOH end groups.

The number of unstable end groups can be determined by Fourier-transform infrared spectroscopy, as described in the Examples, below.

Because of the advantages described above the present disclosure provides a method of making a copolymer in the presence of at least one of an initiator or buffer comprising alkali-metal cations. The method includes copolymerizing components that include tetrafluoroethylene, hexafluoropropylene, and at least one compound independently represented by formula CF$_2$=CF(CF$_2$)$_x$(OC$_y$F$_{2y}$)$_z$ORf' in the presence of at least one of an initiator or buffer comprising alkali-metal cations. Rf' is a linear or branched perfluoroalkyl group having from 1 to 8 carbon atoms and optionally interrupted by one or more —O— groups, z is 1 or 2, y is from 1 to 6, and x is 0 or 1. In some embodiments, y is from 1 to 4, or from 1 to 3, or from 2 to 3, or from 2 to 4. In some embodiments, y is 1 or 3. In some embodiments, y is 3. When z is 2, the y in the two C$_y$F$_{2y}$ groups may be independently selected. However, within a C$_y$F$_{2y}$ group, a person skilled in the art would understand that y is not independently selected. C$_y$F$_{2y}$ may be linear or branched. In some embodiments, C$_y$F$_{2y}$ can be written as (CF$_2$)$_y$, which refers to a linear perfluoroalkylene group. In some embodiments, C$_y$F$_{2y}$ is —CF$_2$—CF$_2$—CF$_2$—. In some embodiments, C$_y$F$_{2y}$ is branched, for example, —CF$_2$—CF(CF$_3$)—. In some embodiments, (OC$_n$F$_{2n}$)$_z$ is represented by —O—(CF$_2$)$_{1-4}$—[O(CF$_2$)$_{1-4}$]$_{0-1}$. In some embodiments, Rf' is a linear or branched perfluoroalkyl group having from 1 to 8 (or 1 to 6) carbon atoms that is optionally interrupted by up to 4, 3, or 2 —O— groups. In some embodiments, Rf' is a perfluoroalkyl group having from 1 to 4 carbon atoms optionally interrupted by one —O— group. The method can be carried out, and the polymer can be isolated, using any of the techniques and reagents described above.

Some Embodiments of the Disclosure

In a first embodiment, the present disclosure provides a copolymer comprising tetrafluoroethylene units, hexafluoropropylene units, and units independently represented by formula

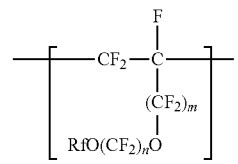

in a range from 0.02 to 2 mole percent, based on the total amount of the copolymer, wherein n is from 1 to 6, m is 0 or 1, and Rf is a linear or branched perfluoroalkyl group having from 1 to 8 carbon atoms and optionally interrupted by one or more —O— groups, wherein the copolymer has a melt flow index in a range from 25 grams per 10 minutes to 35 grams per 10 minutes measured at a temperature of 372° C. and at a support weight of 5.0 kg, and wherein the copolymer has not more than 50 unstable end groups per 10$^6$ carbon atoms, wherein the unstable end groups are selected from the group consisting of —COOM, —CH$_2$OH, —COF, and —CONH$_2$, and wherein M is independently an alkyl group, a hydrogen atom, a metallic cation, or a quaternary ammonium cation.

In a second embodiment, the present disclosure provides the copolymer of the first embodiment, wherein the copolymer comprises at least 25 parts per million (ppm) alkali-metal cations.

In a third embodiment, the present disclosure provides a copolymer comprising tetrafluoroethylene units, hexafluoropropylene units, and units represented by formula

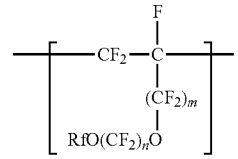

in a range from 0.02 to 2 mole percent, based on the total amount of the copolymer, wherein n is from 1 to 6, m is 0 or 1, and Rf is a linear or branched perfluoroalkyl group having from 1 to 8 carbon atoms and optionally interrupted by one or more —O— groups, wherein the copolymer has a melt flow index in a range from 25 grams per 10 minutes to 35 grams per 10 minutes, and wherein the copolymer at least 25 parts per million (ppm) alkali-metal cations.

In a fourth embodiment, the present disclosure provides the copolymer of the third embodiment, wherein the copolymer has not more than 50 unstable end groups per $10^6$ carbon atoms.

In a fifth embodiment, the present disclosure provides the copolymer of any one of the first to fourth embodiments, wherein m is 0.

In a sixth embodiment, the present disclosure provides the copolymer of any one of the first to fifth embodiments, wherein Rf is —$CF_3$, and wherein n is 1 or 3.

In a seventh embodiment, the present disclosure provides the copolymer of the sixth embodiment, wherein n is 3.

In an eighth embodiment, the present disclosure provides the copolymer of any one of the first to seventh embodiments having not more than 40 unstable end groups per $10^6$ carbon atoms.

In a ninth embodiment, the present disclosure provides the copolymer of any one of the first to eighth embodiments having not more than 25 unstable end groups per $10^6$ carbon atoms.

In a tenth embodiment, the present disclosure provides the copolymer of any one of the first to ninth embodiments, wherein the copolymer comprises at least 50 ppm alkali-metal cations.

In an eleventh embodiment, the present disclosure provides the copolymer of any one of the first to tenth embodiments, wherein the copolymer has a polydispersity of less than or equal to 2.5.

In a twelfth embodiment, the present disclosure provides the copolymer of any one of the first to eleventh embodiments, wherein the hexafluoropropylene units are present in the copolymer at 10 percent to 17 percent by weight, based on the total weight of the copolymer.

In a thirteenth embodiment, the present disclosure provides the copolymer of any one of the first to the twelfth embodiments having a melting point in a range from 220° C. to 285° C.

In a fourteenth embodiment, the present disclosure provides the copolymer of any one of the first to thirteenth embodiments, wherein the copolymer is not foamed.

In a fifteenth embodiment, the present disclosure provides the copolymer of any one of the first to thirteenth embodiments, wherein the copolymer is foamed.

In a sixteenth embodiment, the present disclosure provides the copolymer of any one of the first to fifteenth embodiments, wherein the copolymer has a melt flow index in a range from 27 grams per 10 minutes to 33 grams per 10 minutes.

In a seventeenth embodiment, the present disclosure provides the copolymer of any one of the first to sixteenth embodiments, further comprising units represented by formula

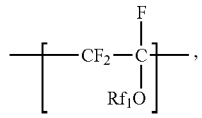

wherein $Rf_1$ is a perfluoroalkyl group having from 1 to 8 carbon atoms.

In an eighteenth embodiment, the present disclosure provides a method of making an extruded article, the method comprising extruding a melted composition comprising (or consisting of) the copolymer of any one of the first to seventeenth embodiments.

In a nineteenth embodiment, the present disclosure provides the method of the eighteenth embodiment, wherein the extruded article comprises at least one of a film, tube, pipe, or hose.

In a twentieth embodiment, the present disclosure provides the method of the eighteenth or nineteenth embodiment, wherein the melted composition is extruded onto a conductor.

In a twenty-first embodiment, the present disclosure provides the method of any one of the eighteenth to twentieth embodiments, wherein the melted composition is extruded onto a cable or wire.

In a twenty-second embodiment, the present disclosure provides an extruded article comprising the copolymer of any one of the first to seventeenth embodiments.

In a twenty-third embodiment, the present disclosure provides the extruded article of the twenty-second embodiment, wherein the extruded article comprises at least one of a film, tube, pipe, or hose.

In a twenty-fourth embodiment, the present disclosure provides the extruded article of the twenty-second or twenty-third embodiment, wherein the extruded article is a conductor having the copolymer extruded thereon.

In a twenty-fifth embodiment, the present disclosure provides the extruded article of any one of the twenty-second to twenty-fourth embodiments, wherein the extruded article is a cable or wire having the copolymer extruded thereon.

In a twenty-sixth embodiment, the present disclosure provides the method of any one of the eighteenth to twenty-first embodiments or the extruded article of any one of the twenty-second to twenty-fifth embodiments, wherein the extruded article is not foamed.

In a twenty-seventh embodiment, the present disclosure provides the method of any one of the eighteenth to twenty-first embodiments or the extruded article of any one of the twenty-second to twenty-fifth embodiments, wherein the extruded article is foamed.

In a twenty-eighth embodiment, the present disclosure provides a method of making the copolymer of any one of the first to seventeenth embodiments, the method comprising copolymerizing components comprising tetrafluoroethylene, hexafluoropropylene, and at least one compound independently represented by formula $CF_2$=$CF(CF_2)_m$O$(CF_2)_n$ORf, wherein n is from 1 to 6, m is 0 or 1, and Rf is a perfluoroalkyl group having from 1 to 8 carbon atoms and optionally interrupted by one or more —O— groups.

In a twenty-ninth embodiment, the present disclosure provides the method of the twenty-eighth embodiment, wherein copolymerizing is carried out by aqueous emulsion polymerization.

In a thirtieth embodiment, the present disclosure provides the method of the twenty-eighth embodiment, wherein copolymerizing is carried out by suspension polymerization.

In a thirty-first embodiment, the present disclosure provides the method of the twenty-ninth or thirtieth embodiments, wherein the aqueous emulsion polymerization or suspension polymerization is carried out in the presence of a buffer comprising an alkali-metal cation.

In a thirty-second embodiment, the present disclosure provides the method of any one of the twenty-eighth to thirty-first embodiments, wherein the components further comprise an initiator comprising an alkali-metal cation.

In a thirty-third embodiment, the present disclosure provides a method of making a copolymer, the method comprising copolymerizing components comprising tetrafluoroethylene, hexafluoropropylene, and at least one compound independently represented by formula $CF_2=CF(CF_2)_x(OC_yF_{2y})_zORf$, wherein y is independently from 1 to 6, z is 0 or 1, x is 1 or 2, and Rf is a perfluoroalkyl group having from 1 to 8 carbon atoms and optionally interrupted by one or more —O— groups, and wherein copolymerizing is carried out in the presence of at least one of an initiator comprising an alkali-metal cation or a buffer comprising an alkali-metal cation.

In a thirty-fourth embodiment, the present disclosure provides the method of the thirty-third embodiment, wherein copolymerizing is carried out by aqueous emulsion polymerization.

In a thirty-fifth embodiment, the present disclosure provides the method of the thirty-third embodiment, wherein copolymerizing is carried out by suspension polymerization.

In a thirty-sixth embodiment, the present disclosure provides the method of the thirty-fourth or thirty-fifth embodiments, wherein the aqueous emulsion polymerization or suspension polymerization is carried out in the presence of a buffer comprising an alkali-metal cation.

In a thirty-seventh embodiment, the present disclosure provides the method of the thirty-fourth or thirty-fifth embodiments, wherein the aqueous emulsion polymerization or suspension polymerization is carried out in the presence of an initiator comprising an alkali-metal cation.

In a thirty-eighth embodiment, the present disclosure provides the method of any one of the thirty-third to thirty-seventh embodiments, wherein m is 0.

In a thirty-ninth embodiment, the present disclosure provides the method of any one of the thirty-third to thirty-eighth embodiments, wherein Rf is —$CF_3$, and wherein n is 1 or 3.

In a fortieth embodiment, the present disclosure provides the method of the thirty-ninth embodiment, wherein n is 3, and z is 1.

In a forty-first embodiment, the present disclosure provides the method of any one of the thirty-third to fortieth embodiments, wherein the components further comprise at least one of perfluoromethyl vinyl ether, perfluoroethyl vinyl ether, perfluoropropyl vinyl ether, or perfluorobutyl vinyl ether.

The following specific, but non-limiting, examples will serve to illustrate the present disclosure. In these examples, abbreviations include g for grams, kg for kilograms, m for mass, min for minutes, hrs for hours, rpm for revolutions per minute.

EXAMPLES

Test Methods:
MFI

The melt flow index (MFI), reported in g/10 min, was measured with a Goettfert MPX 62.92 melt indexer (Buchen, Germany) following a similar procedure to that described in DIN EN ISO 1133-1:2012-03 at a support weight of 5.0 kg and a temperature of 372° C. The MFI was obtained with a standardized extrusion die of 2.1 mm in diameter and a length of 8.0 mm.

Melting Point

The melting point of the fluorothermoplastic polymer was determined using differential scanning calorimetry following a similar procedure to that described in ASTM D4591-07 (2012) using a PerkinElmer Pyris 1 DSC (Waltham, Mass., USA) under nitrogen flow with a heating rate of 10° C./min. The reported melting points relate to the melting peak maximum.

Particle Size

The latex particle size determination was conducted by means of dynamic light scattering with a Malvern Zetasizer 1000HSA (Malvern, Worcestershire, UK) following a similar procedure to that described in DIN ISO 13321:2004-10. The reported average particle size is the z-average. Prior to the measurements, the polymer latexes as yielded from the polymerizations were diluted with 0.001 mol/L KCl-solution. The measurement temperature was 20° C. in all cases.

Monomer Unit Content

The content of $CF_2=CF—CF_2—O—(CF_2)_3—OCF_3$ (MA-31), $CF_2=CF—CF_2—O—C_3F_7$(MA-3), $CF_2=CF—O—(CF_2)_3—OCF_3$ (MV-31), $CF_2=CF—O—C_3F_7$(PPVE-1), and $CF_2=CF—CF_3$ (HFP) in the copolymer was determined by Fourier-transform infrared spectroscopy. Thin films of approximately 0.1 mm thickness were prepared by molding the polymer at 350° C. using a heated plate press. The films were than scanned in nitrogen atmosphere using a Nicolet DX 510 FT-IR spectrometer. The OMNIC software (ThermoFisher Scientific, Waltham, Mass., USA) was used for data analysis. The content of MA-31, MA-3, MV-31, PPVE-1, PSEPVE and HFP, reported in units of m/m %, was determined from an IR band at a monomer-specific wavenumber $v_M$ and was calculated as a product of a monomer-specific factor $\varepsilon_{rel}$ and the ratio of the absorbance of the IR-peak at $v_M$, $A(v_M)$, to the absorbance of the IR-peak at 2365 $cm^{-1}$, $A(2365\ cm^{-1})$, meaning $\varepsilon_{rel}A(v_M)/A(2365\ cm^{-1})$. Wavenumbers $v_M$ and factors $\varepsilon_{rel}$ are given in the following table:

| monomer | wavenumber $v_M$ [1/cm] | factor $\varepsilon_{rel}$ |
|---|---|---|
| $CF_2=CF—CF_2—O—(CF_2)_3—OCF_3$ | 892 | 3.81 |
| $CF_2=CF—CF_2—O—C_3F_7$ | 995 | 61 |
| $CF_2=CF—O—(CF_2)_3—OCF_3$ | 893 | 3.24 |
| $CF_2=CF—O—C_3F_7$ | 993 | 0.95 |
| $CF_2=CF—CF_3$ | 983 | 3.2 |

In case of the simultaneous presence of PPVE-1 and HFP, the deconvolution software "Peak Fit" from AISN Software Inc., version 4.06, was used to determine the monomer-specific absorbance of the IR-peak at $v_M$. The automatic peak detection and fitting method II, second derivative method, was applied.

For the Examples below. $CF_4=CFO(CF_2)_3OCF_3$ was prepared according to the method described in U.S. Pat. No. 6,255,536 (Worm et al.).

End Group Analysis

Polymer end group detection was conducted in analogy to the method described in U.S. Pat. No. 4,743,658 (Imbalzano et al.). Thin films of approximately 0.50 mm were scanned on the same Nicolet Model 510 Fourier-transform infrared spectrometer. 16 scans were collected before the transform is performed, all other operational settings used were those provided as default settings in the Nicolet control software. Similarly, a film of a reference material known to have none of the end groups to be analyzed was molded and scanned. The reference absorbance spectrum is subtracted from the sample absorbance, using the interactive subtraction mode of the software. The $CF_2$ overtone band at 2365 wavenumbers is used to compensate for thickness differences between sample and reference during the interactive subtraction. The difference spectrum represents the absorbances due to non-perfluorinated polymer end groups. The number of end groups per million carbon atoms was determined via the equation: ends/1e6 carbons=absorbance×CF/film thickness in mm. The calibration factors (CF) used to calculate the numbers of end groups per million carbon atoms are summarized in the following table:

| End group | Wavenumber [1/cm] | Calibration Factor (CF) |
|---|---|---|
| —COF | 1885 | 1020 |
| —CONH$_2$ | 3438 | 1105 |
| —COOH, isolated | 1814 | 740 |
| —COOH, associated | 1775 | 112 |
| —CF$_2$H | 2950-3050 (integrated) | 846 |
| —CF(CF$_3$)H | 2820-3000 (integrated) | 224 |
| —CF=CF$_2$ | 1784 | 532 |
| —SO$_2$F | 1467 | 400 |
| —SO$_3$H | 1063 | 3030 |

After the interactive subtraction, the absorbance of the —SO$_3$H peak was not quantified using the OMNIC software of the Nicolet Model 510 Fourier-transform infrared spectrometer, because the weak —SO$_3$H peak is partially overlapping by other peaks in the direct neighborhood of 1063 l/cm and it appears as part of a peak-shoulder around 1050 l/cm. In this case, the deconvolution software "Peak Fit" from AISN Software Inc., version 4.06, was used to determine the absorbance the —SO$_3$H peak. The automatic peak detection and fitting method II, second derivative method, was applied with usually about 22% smoothing to a wavenumber region of 1020 to 1075 l/cm. Four Pearson VII Amplitude peaks of uniform width and a linear 2 point baseline were usually applied to fit that region. The —SO$_3$H peak is the one located at the highest wavenumber, the corresponding absorbance is the parameter a0 taken from peak fit summary.

The —CF$_2$H peak is discernible at a peak around 3009 l/cm with a shoulder at about 2983 l/cm. The peak deconvolution procedure "Peak Fit" software from AISN Software Inc applied as described above in a region in between 2900 and 3100 l/cm reveals additional peaks located at about 2936, 2960, 3032 and 3059 l/cm. These peaks are integrated and the number of end groups per million carbon atoms was determined from the total peak area via the equation: ends/1e6 carbons=area×CF/film thickness in mm, wherein a Calibration Factor of 846 was applied.

The —CF(CF$_3$)H group shows a broad peak band with main peaks around 2973, 2930 and 2858 l/cm. The peak deconvolution procedure "Peak Fit" software from AISN Software Inc applied in a region in between 2820 and 3000 l/cm may reveal additional peaks located at about 2830, 2845, 2871, 2885, 2900, 2916, 2943 and 2258 l/cm. These peaks are integrated and the number of end groups per million carbon atoms was determined from the total peak area via the equation: ends/1e6 carbons=area×CF/film thickness in mm, wherein a Calibration Factor of 224 was applied. When —CF$_2$H groups and —CF(CF$_3$)H groups are present at one time, the peak deconvolution procedure needs to be applied to the wavenumber region in between 2820 and 3050 l/cm. Then, the contributions of both groups to the broad peak need to be separated from each other and considered independently using the equations given above.

Polydispersity Determination by Melt Rheology

Oscillatory shear flow measurements were conducted on fluoropolymer melts using a strain controlled ARES rheometer (3ARES-13; Firmware version 4.04.00) (TA Instruments Inc., New Castle, Del., USA) equipped with a FRT 200 transducer with a force range of up to 200 g. Dynamic mechanical data were recorded in nitrogen atmosphere in frequency sweep experiments using a 25 mm parallel plate geometry and a plate to plate distance of usually 1.8 mm was realized. Individual frequency sweeps were recorded at a temperature of 372° C., 340° C., 300° C., 280° C. and in super-cooled melt at 260° C. The thermal control of the oven was operated using the sample/tool thermal element. A strain typically ascending from 1 to 20% was applied while the shear rate was descended from 100 rad/s to typically 0.1 rad/s. Using the time-temperature-superposition (TTS) tool provided by the orchestrator software (version 7.0.8.13), these individual frequency sweeps were combined to one master curve, wherein T=372° C. was selected as the reference temperature. Zero shear viscosities $\eta_0$, reported in units of Pa×s, were extrapolated from the viscosity function $\eta^*(\omega)$ of the obtained dynamic mechanical master curve using the 4 parameter Carreau fit function provided by the orchestrator software. The molecular weight distribution of fluoropolymer melts were extracted from the so-obtained dynamic mechanical data by the procedure disclosed by W. H. Tuminello in Polym. Engineering Sci., 26, 1339-1347 (1986) and in Encyclopedia of Fluid Mechanics, Vol. 9, Polymer Flow Engineering, 209. The method includes that the frequency is converted into a molecular weight. In the present case, the equation $$1/\omega = 7.63e-22 \times M^{3.6}$$

was used. In the same way as described by Tuminello, the cumulative molecular weight distribution (CMWD) is evaluated by forming the expression $$CMWD = 100 \times \{1 - [G'(\omega)/G_N^0]^{0.5}\}.$$

Herein, a plateau modulus of $G_N^0 = 1.1e6$ Pa was used. In modification of the method described by Tuminello, the sigmoidal CMWD is approximated by a function of the Weibull-type:

$$CMWD = 100 \times (1 - \exp(-((x+d^*(b-x0))/b)^c)),$$
with $x = \log M$, $$d = ((c-1)/c)^{(1/c)}; c = 3.376 + 2.305 \times b; b = 1.8 + 9.154e-4 \times 600.95^{chi}$$

A user defined fit routine operating under the software SigmaPlot 12.5 (Systat Software, Inc.; San Jose/CA, USA) was used to determine the two fit parameters x0 and chi. The first derivative of the fit function was evaluated by applying the macro "Compute 1$^{st}$ Derivative" provided by the SigmaPlot 12.5 software. The first derivative of the fit function is representing a Schulz-Zimm distribution described by Equation (6) in Auhl et al., Macromolecules 2006, Vol. 39, No. 6, p. 2316-2324. The maximum of this distribution is given by the number average molecular weight $M_N$ and its breadth is controlled by the degree of coupling k. The degree of coupling k is then converted into the polydispersity index $M_W/M_N$ according to a 5-order polynomial:

$$k = d0 + d1 \times U + d2 \times U^2 + d3 \times U^3 + d4 \times U^4 + d5 \times U^5;$$
with $U = M_W/M_N$ d0=183.3296154186 d1=−445.7760158725
d2=443.8169326941 d3=−223.4535380971
d4=56.6264675389 d5=−5.7637913869

Finally, the consistency of the obtained result is probed by comparing the mass average molecular weight $M_W$ of this Schulz-Zimm distribution with the one obtained from the zero shear viscosity by:

$$\eta_0(372° C.) = 9.36e-17 \times M_W^{3.6}.$$

The molecular weight distribution is correctly extracted from the rheology data in the case that both $M_W$ values deviate from each other by less than ±5%. The results reported herein fulfill this consistency criterion.

Alkali-Ion Content

For the determination of the alkali-ion content, 1 g polymer was combusted in a muffle-type furnace (Linn High Term; Eschenfelden, Germany; VMK39μP) for 10 hrs (air at 550° C.). The incineration residue was dissolved into 50 mL of a 4 vol. % aqueous solution of HCl/HF (5:1) (HCl: 30% aqueous solution available from Merck, Darmstadt/Germany, under the trade designation "SUPRAPUR"; HF: 40% aqueous solution available from Merck, Darmstadt/Germany under the trade designation "SUPRAPUR"). The acidic solution was further analyzed by an "AANALYST 200" Perkin Elmer flame atomic absorption spectrometer (Waltham, Mass./USA). The instrument was calibrated with 0.500 ppm and 1.000 ppm potassium aqueous standard solutions (Merck; Darmstadt/Germany; "CERTIPUR" Element Standard Solution). The peak height at a wavelength of 766.5 nm was used to evaluate the potassium content. The peak height at a wavelength of 589 nm was used to evaluate the sodium content.

Capillary Rheometry

Steady shear flow behavior was measured using a Rosand RH7 capillary rheometer with a 1 mm diameter flat entry die and an L/D=16. In each case, the barrel was heated to 375° C. and filled with 60 g of the material, which was then extruded at 375° C., through a sequence of shear rates. Before the test, the pressure was increased to 0.5 MPa, followed by a dwell time of 6 min, and then increased again to 0.5 MPa, followed by a dwell time of 3 min. An initial shear rate of 400/s was used as a conditioning step, followed by sequential steps at 10, 15, 25, 40, 60, 100, 150, 250, 400, 600, 1000/s or 40, 60, 100, 150, 200, 300, 400, 600, 1000, 1500/s. The pressure was allowed to equilibrate at each step before the pressure was recorded. The sequence was followed until the rheometer barrel was empty, at which point the test was stopped. The apparent shear rate and the apparent shear stress were calculated for each extrusion condition. No corrections were applied. See F. N. Cogswell, "Polymer Melt Rheology", Ed. John Wiley & Sons, New-York. According to F. N. Cogswell, the Rabinovich correction is at the most 15%. The end correction is in the order of 5% (L/D=40). Both were well within the experimental error of the technique used here. An extrudate strand was collected at each shear rate and examined under a reflection microscope (magnification 10 to 35×) to assess the appearance of the strand. The shear rate at which melt fracture onset occurred was visually determined.

Example 1a and 1b (Ex. 1a and 1b)

Part A

A copolymer of TFE (tetrafluoroethylene), HFP (hexafluoropropylene), and MV-31 ($CF_2$=$CFO(CF_2)_3OCF_3$) was prepared as follows:

A 52-L-polymerization kettle with an impeller agitator was charged with 30 L deionized water, 48 g aqueous 25 wt % ammonia-solution and 438 g of a 30 wt % aqueous solution of ammonium 4,8-dioxa-3-H-perfluorononanoate ($CF_3$—O—$(CF_2)_3$—O—CFH—$CF_2$—$COONH_4$, prepared as described in "Preparation of Compound 11" in U.S. Pat. No. 7,671,112). The oxygen-free kettle was then heated to 70° C., the agitation system was set to 240 rpm. MV-31 (31 g) was added and TFE/HFP at a ratio of 41/59 mol % were added until a final pressure of 17.0 bar (1700 kPa) was reached. The polymerization was initiated by adding 65 g ammonium peroxydisulfate (APS), dissolved in 500 mL $H_2O$. The polymerization temperature was maintained at 70° C. and the pressure was kept at 17 bar (1700 kPa). The monomer feed was constant; overall 12.4 kg TFE, 1.12 kg HFP and 161 g MV-31 were fed. The total runtime was 5 hours. The obtained latex had a solid content of 31.1 wt %, and the average particle size was 79 nm. The latex was coagulated by the addition of aqueous 35 wt % HCl, agglomerated with gasoline, washed with deionized $H_2O$ and dried for 16 hours at 190° C. to provide the polymer. The MFI (372° C./5 kg) was 27 g/10 min, the melting point was 247° C., the MV-31-content was determined as 0.64 wt %, and the HFP-content was determined as 11 wt %. The alkali ion content was <1 ppm. The polydispersity $M_W/M_N$ was determined as 1.72.

Part B

A portion (1312 g) of the dispersion from Part A was diluted to a solids content of 22.86 wt. % with deionized $H_2O$, filtered, and added to a 3-L beaker. Under gentle stirring, 3 grams of a 10 wt. % KOH solution was added, and the resulting mixture was stirred for 5 min. The latex was coagulated by the addition of aqueous 35 wt. % HCl, agglomerated with gasoline, washed with deionized water, and dried for 16 hours at 190° C. to provide the polymer. The potassium content was determined to be 270 ppm.

Part C

The polymer from Part B was post-fluorinated. A 10-L-post-fluorination reactor was charged with 100 g of the dried polymer. The oxygen-free reactor was then heated up to 200° C. Then the reactor was evacuated to 0.250 bar absolute (25 kPa). The vacuum was broken up to a pressure of 0.99 bar absolute (99 kPa) with a with a fluorine gas/nitrogen gas mixture (10 vol. %/90 vol. %, N50, Air Liquide; München/Germany). After 30 minutes reaction time, the fluorine/nitrogen mixture was evacuated to a pressure of 0.250 bar absolute (25 kPa). This process was repeated twice for Example 1a and 4 times for Example 1b, as shown in Table 1, below. Afterwards the reactor was vented and flushed with $N_2$ in thirty cycles.

TABLE 1

|  | Ill. Ex. 4 | Ill. Ex. 5 | Ill. Ex. 6 | Example 1a | Example 1b |
|---|---|---|---|---|---|
| KOH added [g] | 1 | 1.5 | 3 | 3 | 3 |
| Potassium Content [ppm] | 65 | 130 | 270 | 270 | 270 |
| —COOH, iso, 1814 [1/$10^6$ C-Atoms] | 260 | 8 | 2 | 11 | <1 |
| —COOH, ass, 1795 [1/$10^6$ C-Atoms] | 97 | 13 | 18 | 3 | 4 |
| —$CONH_2$ [1/$10^6$ C-Atoms] | 22 | 33 | 44 | <1 | <1 |
| —$CF_2H$ and —CFH—$CF_3$ [1/$10^6$ C-Atoms] | 468 | 516 | 660 | <1 | <1 |

TABLE 1-continued

| | Ill. Ex. 4 | Ill. Ex. 5 | Ill. Ex. 6 | Example 1a | Example 1b |
|---|---|---|---|---|---|
| —COF [$1/10^6$ C-Atoms] | <1 | 15 | 7 | 1 | <1 |
| —CF=$CF_2$ [$1/10^6$ C-Atoms] | <1 | 153 | 123 | 3 | 2 |
| Sum [$1/10^6$ C-Atoms] | 847 | 738 | 854 | 18 | 6 |
| MFI (372/5) [g/10 min] | 27 | 27 | 27 | 27 | 27 |
| Post Fluorination Cycles | 0 | 0 | 0 | 2 | 4 |

Illustrative Examples 1 to 6 and Example 2

Illustrative Examples 1 to 6 and Example 2 were prepared according to the method of Examples 1a and 1b, with the following modifications. For Illustrative Examples 1 to 3 and Example 2, no KOH was added, and different numbers of fluorination cycles were used as shown in Table 2, below. For Illustrative Examples 4 to 6, different amounts of KOH were used as shown in Table 1, but no post-fluorination cycles were carried out. A comparison of Tables 1 and 2 shows the high efficiency of the elimination of —$CF_2$H and —CFH—$CF_3$ end groups in comparison to —COOH end groups.

TABLE 2

| | Ill. Ex. 1 | Ill. Ex. 2 | Ill. Ex. 3 | Ex. 2 |
|---|---|---|---|---|
| —COOH, iso, 1814 [$1/10^6$ C-Atoms] | 496 | 145 | 15 | <1 |
| —COOH, ass, 1795 [$1/10^6$ C-Atoms] | 178 | 48 | 5 | 2 |
| —$CONH_2$ [$1/10^6$ C-Atoms] | 7 | 13 | <1 | <1 |
| —$CF_2$H [$1/10^6$ C-Atoms] | <1 | <1 | <1 | <1 |
| —COF [$1/10^6$ C-Atoms] | 10 | 22 | 111 | 1 |

TABLE 2-continued

| | Ill. Ex. 1 | Ill. Ex. 2 | Ill. Ex. 3 | Ex. 2 |
|---|---|---|---|---|
| —CF=$CF_2$ [$1/10^6$ C-Atoms] | <1 | <1 | <1 | <1 |
| Sum [$1/10^6$ C-Atoms] | 691 | 228 | 131 | 3 |
| MFI (372/5) [g/10 min] | 27 | 27 | 27 | 27 |
| Post Fluorination Cycles | 0 | 2 | 4 | 14 |
| Film Thickness [mm] | 0.32 | 0.31 | 0.59 | 0.46 |

Illustrative Example 7 (Ill. Ex. 7) and Example 3

A copolymer of TFE (tetrafluoroethylene), HFP (hexafluoropropylene), and MV-31 ($CF_2$=CFO($CF_2$)$_3$O$CF_3$) was prepared as described in Example 1 except using a different kettle. The amounts of the starting materials and reagents were scaled to the size of the kettle. Additionally, instead of the ammonia solution, potassium hydroxide was added to the precharged water in an amount to achieve a concentration of 2 g/L. The absolute reaction pressure was 17.0 bar (1700 kPa), and the partial pressure of HFP was 10.0 bar (1000 kPa). The monomer feed mole fractions were adjusted to $x_{TFE}$=0.942, $x_{HFP}$=0.056, and $x_{MV-31}$=0.002. The polymerization was continued with these monomer mole fractions for 330 minutes until a polymer dispersion having a solid content of 33 mass % was achieved. The latex particles were 95 nm in diameter as measured by dynamic light scattering.

A portion of the agglomerated and washed polymer was dried at 190° C. for 16 hours to provide Example 3. The end groups were analyzed using the method described above, and the results are shown in Table 3, below.

A portion of the agglomerated and washed polymer was dried at 130° C. for 16 hours to provide Illustrative Example 7. The end groups were analyzed using the method described above, and the results are shown in Table 3, below.

TABLE 3

| | Drying Temperature [° C.] | —COOH, iso [$1/10^6$ C-Atoms] | —COOH, ass [$1/10^6$ C-Atoms] | —COF [$1/10^6$ C-Atoms] | —$CF_2$H and CFH—$CF_3$ [$1/10^6$ C-Atoms] | Total number of end groups [$1/10^6$ C-Atoms] |
|---|---|---|---|---|---|---|
| Ill. Ex. 7 | 130 | 485 | 183 | <1 | <1 | 668 |
| Ex. 3 | 190 | 18 | 7 | <1 | 608 | 633 |

Additional properties of the dry polymer of Example 3 are shown in Table 4, below.

Example 4 (Ex. 4)

The copolymer of Example 4 was prepared in the same manner as in Illustrative Example 7 and Example 3 except that the monomer feed mole fractions were adjusted to $x_{TFE}$=0.943, $x_{HFP}$=0.056, and $x_{MV-31}$=0.001. The latex particles were 97 nm in diameter as measured by dynamic light scattering. The polymer was dried for 16 hr at 190° C. Properties of the dry polymer agglomerate are shown in Table 4, below.

Example 5 (Ex. 5)

The copolymer of Example 5 was prepared in the same manner as in Illustrative Example 7 and Example 3 except that the monomer feed mole fractions were adjusted to $x_{TFE}$=0.940, $x_{HFP}$=0.056, and $x_{MV-31}$=0.004. The latex particles were 94 nm in diameter as measured by dynamic light scattering. The polymer was dried for 16 hr at 190° C. Properties of the of the dry polymer agglomerate are shown in Table 4, below.

TABLE 4

|  | Ex. 3 | Ex. 4 | Ex. 5 |
| --- | --- | --- | --- |
| Melting point (maximum) (° C.) | 252 | 263 | 252 |
| MFI (372° C./5 kg)/ (g/10 min) | 32 | 29 | 32 |
| $CF_2$=$CFO(CF_2)_3OCF_3$ content (wt. %) | 0.63 | 0.30 | 0.94 |

Example 6 (Ex 6)

The copolymer from Example 3 was melt pelletized and the melt pellets were converted into a tumbling drier available from OHL Apparatebau (Limburg a.d. Lahn/Germany) so that a volume filling level of 70% achieved. The oxygen-free tumbling drier was evacuated and subsequently charged with diluted elemental fluorine gas (10 vol % $F_2$ in 90 vol % nitrogen; N50, Air Liquide; München/Germany). The reactor wall of the tumbling drier was heated to 200° C., and the reactor was slowly rotated for 30 minutes once the target temperature was reached. After the reactor was vented and purged with nitrogen in three cycles, a polymer sample was collected and subjected for end group analysis. Then the reactor was made oxygen-free, filled with diluted fluorine gas, rotated for another 30 minutes at a jacket temperature of 200° C., and another polymer sample was taken. The procedure was repeated for several times until 10 fluorination cycles to the polymer melt pellets were achieved. Properties of the obtained polymer are summarized in Table 5, below.

Example 7 and 8 (Ex 7, Ex 8)

The copolymer from Example 4 was melt pelletized and post-fluorinated in the same manner as described in Example 6 to yield Example 7. The same procedure was applied to the copolymer from Example 5 to yield Example 8 with the modification that only 9 fluorination cycles were applied. Properties of the obtained polymers are summarized in Table 5, below.

TABLE 5

|  | Ex. 6 | Ex. 7 | Ex. 8 |
| --- | --- | --- | --- |
| Potassium [ppm] | 60 | 66 | 60 |
| $\eta_0$(372° C.) [Pa × s] | 1200 | 1300 | 1200 |
| Mw/Mn | 1.75 | 1.76 | 1.72 |
| —COOH, iso. [1/$10^6$ C-Atoms] | 0 | 0 | 0 |
| —COOH, assoc. [1/$10^6$ C-Atoms] | 1 | 1 | 1 |
| —COF [1/$10^6$ C-Atoms] | 8 | 5 | 5 |
| —$CF_2$H and CFH—$CF_3$ [1/$10^6$ C-Atoms] | 52 | 57 | 89 |
| Total number unstable end groups [1/$10^6$ C-Atoms] | 9 | 6 | 6 |

Steady shear flow behavior was measured for Examples 6, 7, and 8 using the test method described above. The shear rate at which melt fracture onset occurred was visually determined (measured onset shear rate). The results are reported in Table 6, below. The apparent equivalency between Examples 6 and 7 is due to the selection of shear rates in this test. Actual critical shear rate conditions are known to be greater that the highest measured shear rate before onset and less than or equal to the measured onset shear rate for each material. The same applies to critical shear stress.

TABLE 6

Shear Rate and Shear Stress at Sharkskin Melt Fracture Onset Conditions

|  | "FEP 6322Z" | "FEP 6338Z" | Ex 6 | Ex 7 | Ex 8 | "DUPONT FEP 9494X" |
| --- | --- | --- | --- | --- | --- | --- |
| Shear Rate ($sec^{-1}$) | 150 | 300 | 200 | 200 | 400 | 300 |
| Shear Stress (kPa) | 111 | 148 | 120 | 122 | 192 | 168 |

"FEP 6322Z" and "FEP 6338Z" are trade designations for commercial "3M DYNEON" fluoroplastic FEP copolymers from 3M Company, St. Paul, MN.
"DUPONT FEP 9494X" is a trade designation for a commercial FEP copolymer from DuPont, Wilmington, Delaware. It contains 1 percent by weight perfluoroethyl vinyl ether as measured according to the method described in U.S. Pat. No. 5,677,404 (Blair).

Various modifications and alterations of this disclosure may be made by those skilled in the art without departing from the scope and spirit of the disclosure, and it should be understood that this invention is not to be unduly limited to the illustrative embodiments set forth herein.

What is claimed is:

1. A copolymer comprising tetrafluoroethylene units, hexafluoropropylene units, and units represented by formula

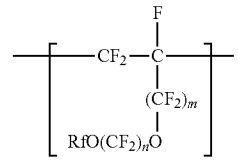

in a range from 0.02 to 2 mole percent, based on the total amount of the copolymer, wherein n is from 1 to 6, m is 0 or 1, and Rf is a linear or branched perfluoroalkyl group having from 1 to 8 carbon atoms and optionally interrupted by one or more —O— groups, wherein the copolymer has a melt flow index in a range from 25 grams per 10 minutes to 35 grams per 10 minutes measured at a temperature of 372° C. and at a support weight of 5.0 kg, and wherein the copolymer comprises at least 25 parts per million alkali-metal cations.

2. The copolymer of claim 1, wherein the copolymer has not more than 50 unstable end groups per $10^6$ carbon atoms.

3. The copolymer of claim 1, wherein m is 0, wherein Rf is —$CF_3$, and wherein n is 1 or 3.

4. A copolymer of claim 2 wherein the unstable end groups are selected from the group consisting of —COOM, —$CH_2OH$, —COF, and —$CONH_2$, and wherein M is independently an alkyl group, a hydrogen atom, a metallic cation, or a quaternary ammonium cation.

5. The copolymer of claim 4, wherein m is 0.

6. The copolymer of claim 4, wherein Rf is —$CF_3$, and wherein n is 1 or 3.

7. The copolymer of claim 4, wherein the copolymer comprises at least 50 parts per million alkali-metal cations.

8. The copolymer of claim 1, wherein the copolymer comprises at least 50 parts per million alkali-metal cations.

9. The copolymer of claim 1, wherein the copolymer has a polydispersity of less than or equal to 2.

10. The copolymer of claim 1, wherein the hexafluoropropylene units are present in the copolymer at 10 percent to 17 percent by weight, based on the total weight of the copolymer.

11. The copolymer of claim 1 having a melting point in a range from 235° C. to 275° C.

12. The copolymer of claim 1, further comprising units represented by formula

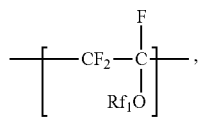

wherein $Rf_1$ is a perfluoroalkyl group having from 1 to 8 carbon atoms.

13. A method of making an extruded article, the method comprising extruding a melted composition comprising the copolymer of claim 1.

14. An extruded article comprising the copolymer of claim 1.

15. The extruded article of claim 14, wherein the extruded article comprises at least one of a film, tube, pipe, or hose.

16. The extruded article of claim 14, wherein the extruded article is a conductor having the copolymer extruded thereon.

17. A method of making the copolymer of claim 1, the method comprising copolymerizing components comprising tetrafluoroethylene, hexafluoropropylene, and at least one compound independently represented by formula $CF_2$=$CF(CF_2)_mO(CF_2)_nORf$, wherein n is from 1 to 6, m is 0 or 1, and Rf is a perfluoroalkyl group having from 1 to 8 carbon atoms and optionally interrupted by one or more —O— groups.

18. The method of claim 17, wherein copolymerizing is carried out by aqueous emulsion polymerization in the presence of a buffer including alkali-metal cations.

19. The extruded article of claim 14, wherein the extruded article is not foamed.

20. The extruded article of claim 14, wherein the extruded article is foamed.

* * * * *

UNITED STATES PATENT AND TRADEMARK OFFICE
CERTIFICATE OF CORRECTION

Page 1 of 1

PATENT NO. : 10,766,990 B2
APPLICATION NO. : 15/550321
DATED : September 8, 2020
INVENTOR(S) : Denis Duchesne It is certified that error appears in the above-identified patent and that said Letters Patent is hereby corrected as shown below:

In the Specification

Column 5
Line 13, delete "$CF_2CF_2$" and insert -- $CF_2$ --, therefor.

Column 8
Line 22, delete "—$(O)_i$—" and insert -- —$(O)_t$— --, therefor.

Column 9
Line 52, delete "$CF_2=CFCF_2O(CF_2)ORf$" and insert -- $CF_2=CFCF_2O(CF_2)_nORf$ --, therefor.

Column 16
Line 32, delete "$\varepsilon_{rel}A(v_M)/A(2365$" and insert -- $\varepsilon_{rel} \times A(v_M)/A(2365$ --, therefor.
Line 51, delete "$CF_4$" and insert -- $CF_2$ --, therefor.

Column 18
Line 37, delete "$(b-x0))/b)\hat{\ })),$" and insert -- $(b-x0))/b)\hat{\ }c)),$ --, therefor.
Line 57 delete "$k=d0+d1 \times U+d2 \times U\hat{\ }2+d3 \times U\hat{\ }+d4 \times U\hat{\ }+d5 \times U\hat{\ }5;$" and insert
-- $k=d0+d1 \times U+d2 \times U\hat{\ }2+d3 \times U\hat{\ }3+d4 \times U\hat{\ }4+d5 \times U\hat{\ }5;$ --, therefor.

Column 21
Line 62, delete "(III." and insert -- (Ill. --, therefor.

In the Claims

Column 24
Line 54, in Claim 4, delete "A copolymer of claim 2" and insert -- The copolymer of claim 2, --, therefor.

Signed and Sealed this
Tenth Day of November, 2020

Andrei Iancu
*Director of the United States Patent and Trademark Office*